United States Patent [19]

Swanson

[11] 4,244,826
[45] * Jan. 13, 1981

[54] GELLED ACIDIC WELL TREATING COMPOSITION AND PROCESS

[75] Inventor: Billy L. Swanson, Bartlesville, Okla.

[73] Assignee: Phillips Petroleum Company, Bartlesville, Okla.

[*] Notice: The portion of the term of this patent subsequent to Oct. 25, 1994, has been disclaimed.

[21] Appl. No.: 925,359

[22] Filed: Jul. 17, 1978

[51] Int. Cl.$^3$ ............................................. E21B 43/27
[52] U.S. Cl. ..................... 252/8.55 C; 166/307; 252/316; 260/14
[58] Field of Search ............... 252/8.55 R, 8.55 C, 252/316; 260/14

[56] References Cited

U.S. PATENT DOCUMENTS

| | | | |
|---|---|---|---|
| 3,134,436 | 5/1964 | Means | 166/295 |
| 3,252,904 | 5/1966 | Carpenter | 252/8.55 |
| 3,475,334 | 10/1969 | Boudreaux | 252/8.55 |
| 3,768,566 | 10/1973 | Ely et al. | 166/283 |
| 3,795,276 | 3/1974 | Eilers et al. | 166/295 |
| 3,923,666 | 12/1975 | Dill | 252/8.55 |
| 4,055,502 | 10/1977 | Swanson | 252/8.55 |
| 4,068,719 | 1/1978 | Clampitt et al. | 166/282 |
| 4,068,720 | 1/1978 | Hessert et al. | 166/282 |
| 4,146,486 | 3/1979 | Hessert et al. | 252/8.55 X |

*Primary Examiner*—Herbert B. Guynn

[57] ABSTRACT

Gelled acidic compositions suitable for either matrix-acidizing or fracture-acidizing of subterranean formations comprising water, a water-dispersible polymer selected from cellulose ethers and polymers of acrylamides, an acid, an aldehyde, and a phenolic compound capable of causing gelation of an aqueous dispersion of the polymer, acid, aldehyde, and phenolic compound are provided. In another embodiment, guar gum, polyvinylpyrrolidone and biopolysaccharides can also be used as the polymeric component in said compositions.

12 Claims, No Drawings

GELLED ACIDIC WELL TREATING COMPOSITION AND PROCESS

This invention relates to gelled acidic compositions and to acid treating or acidizing of subterranean formations. In accordance with another aspect, this invention relates to gelled acidic compositions comprising thickened aqueous acid solutions prepared by mixing water-dispersible polymers, such as cellulose ethers or polyacrylamides, and an acid which are gelled by the addition of an aldehyde and a phenolic compound. In another aspect, guar gum, polyvinylpyrrolidone, and bipolysaccharides can also be used in the instant invention. In accordance with another aspect, this invention relates to gelled acidic compositions suitable for either matrix-acidizing or fracture-acidizing of subterranean formations to enhance the efficiency of oil recovery. In accordance with a further aspect, this invention relates to gelled acidic compositions exhibiting excellent stability and reduced gelation temperatures comprising water, a water-dispersible polymeric material selected from cellulose ethers, polymers of acrylamides, guar gum, polyvinylpyrrolidone, and biopolysaccharides, an acid, an aldehyde, and a phenolic compound.

This invention relates to acid treating or acidizing of subterranean formations.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acid-soluble components of the formation. The technique is not limited to formations of high acid solubility such as limestone, dolomite, etc. The technique is also applicable to other types of formations such as a sandstone containing streaks or striations of acid-soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix-acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix-acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

Poor penetration can also be caused, and/or aggravated, by fluid loss to the more porous zones of the formation where low permeability is not a problem. Poor penetration can also be caused, and/or aggravated, by leak-off at the fracture faces in combination fracturing-acidizing operations. Either said fluid loss or said leak-off can frequently worsen the situation by leaving the tight (low permeability) zones of the formation unchanged and merely opening up the already high permeability zones.

One solution which has been proposed for the above-discussed problem is to incorporate various polymeric thickening or viscosifying agents into the acid solution. Said agents serve to thicken the acid solution and thus increase the viscosity thereof. It has been reported that so-thickened acid solutions have reduced fluid loss properties. For example, see U.S. Pat. No. 3,415,319 issued in the name of B. L. Gibson and U.S. Pat. No. 3,434,971 issued in the name of B. L. Atkins. It has also been reported that the reaction rate of said so-thickened acid solutions with the acid-soluble portions of the formation is lessened or retarded. See, for example, U.S. Pat. No. 3,749,169 issued in the name of J. F. Tate, U.S. Pat. No. 3,236,305 issued in the name of C. F. Parks, and U.S. Pat. No. 3,252,904 issued in the name of N. F. Carpenter.

Higher viscosities are also advantageous in combination fracturing-acidizing operations in that the more viscous acidic solutions produce wider and longer fractures. More viscous acid solution are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decreased in viscosity. Another such effect is increased rate of reaction of the acid with the formation. Thus, some compositions which would be satisfactory in a low-temperature formation such as in the Hugoton field in the Anadarko basin might not be satisfactory in formations encountered in deeper well as in some West Texas fields.

In ordinary acidizing operations using unthickened acids, there is usually no problem in removing the spent acid because it is essentially water. However, a problem which is sometimes encountered when using thickened compositions in treating formations is in the ease of removal of the treating composition after the operation is completed. Some thickened or highly viscous solutions are difficult to remove from the pores of the formation or the fracture after the operation is complete. Sometimes a clogging residue can be left in the pores of the formation or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above-discussed problems. The present invention provides improved methods for acidizing, or fracture-acidizing, subterranean formations and new gelled acidic compositions for use in said methods.

Accordingly, an object of this invention is to provide gelled acidic compositions that are stable and exhibit reduced gelation temperatures.

Another object of this invention is to provide gelled acidic compositions suitable for matrix-acidizing.

A further object of this invention is to provide gelled acidic compositions suitable for fracture-acidizing of subterranean formations.

Other objects, aspects, and the several advantages of this invention will be apparent from a study of the disclosure and the appended claims.

In accordance with the invention, gelled acidic compositions are provided comprising water; a water-dispersible polymer selected from cellulose ethers, polyacrylamides, polymethacrylamides, guar gum, polyvinylpyrrolidone, and biopolysaccharides; an acid; one or more water-dispersible aldehydes; and one or more phenolic components.

Further, in accordance with the invention, there is provided a method for acid-treating a porous subterranean formation susceptible to attack by an acid and penetrated by a well bore which comprises injecting into the formation a gelled acidic composition comprising water, a water-dispersible polymer as defined herein, an acid, one or more water-dispersible aldehydes, and one or more phenolic compounds and maintaining the gelled acidic composition in the formation for a period of time sufficient for the acid in the composition to react significantly with the acid-soluble components in the formation and stimulate the production of fluids therefrom.

In accordance with one specific embodiment of the invention, the combination of formaldehyde and resorcinol added to a thickened aqueous acid solution containing a water-dispersible polymer as defined results in stable gels exhibiting reduced gelation temperature. The resulting compositions are suitable for either matrix-acidizing or fracture-acidizing of subterranean formations.

Still further, in accordance with other broad aspects of the invention, there are provided methods for preparing said gelled acidic compositions.

In some embodiments of the invention, only one aldehyde and one phenolic component can be used, if desired, instead of a mixture of at least two aldehydes or two phenolic components.

As noted above, the gelled acidic compositions of the invention must be suitable for matrix-acidizing or fracture-acidizing of subterranean formations. In order to satisfy this requirement, the polymer, the acid, the aldehyde(s), and the phenolic component(s), in the amounts used, must be sufficiently compatible with each other, in an aqueous dispersion thereof, to permit the gelation of said dispersion and thus form a composition having sufficient stability to degeneration by the heat of the formation to permit good penetration of said composition into the formation. Furthermore, once said penetration has been attained, the stability must be sufficient to permit the maintaining of said composition in contact with the formation for a period of time sufficient for the acid in the composition to significantly react with the acid-soluble components of the formation and stimulate the production of fluids therefrom, e.g., by creating new passageways or enlarging existing passageways through said formation.

Herein and in the claims, unless otherwise specified, the term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to five or more, in a small volume matrix-acidizing operation, and several hundred feed, e.g., up to 500 or more, in a large volume fracture-acidizing operation.

Herein and in the claims, unless otherwise specified, the term "polymer" is employed generically to include both homopolymers and copolymers; and the term "water-dispersible polymers" is employed generically to include those polymers which are truly water-soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Any suitable polymer of acrylamide meeting the above-stated compatibility requirements can be used in the practice of the invention. Thus, under proper conditions of use, such polymers can include various polyacrylamides and related polymers which are water-dispersible and which can be used in an aqueous medium, with the gelling agents described herein, to given an aqueous gel. These can include the various substantially linear homopolymers and copolymers of acrylamide and methacrylamide. By substantially linear it is meant that the polymers are substantially free of crosslinking between the polymer chains. Said polymers can have up to about 45, preferably up to about 40, percent of the carboxamide groups hydrolyzed to carboxyl groups. Generally speaking, as the degree of hydrolysis increases, the polymers tend to become more difficult to disperse in aqueous acidic media. Thus, one presently more preferred group of polymers includes those wherein not more than about 20 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

As used herein and in the claims, unless otherwise specified, the stated values for "degree of hydrolysis" or "percent hydrolyzed," and like terms, refer to initial values prior to use or test of the polymer. Unless otherwise stated, said values were obtained by the following analytical procedure. Place 200 ml of distilled water in a beaker provided with a magnetic stirrer. Weigh a 0.1 gram polymer sample accurately to ±0.1 mg. Start the stirrer and quantitatively transfer the weighed sample into the water vortex. Stir at a rapid rate overnight. Using a pH meter and 1:1 diluted HCl, adjust the pH of the sample solution to less than 3.0. Stir the solution for 30 minutes. Adjust the pH of the solution to exactly 3.3 by dropwise addition of 0.1 N NaOH. Then slowly titrate with standard 0.1 N NaOH from pH 3.3 to pH 7.0.

$$\% \text{ Hydrolysis} = (V \times N \times 0.072 \times 100)/W$$

where: V = ml of base used in titration; N = normality of base; W = grams of polymer sample; and 0.072 = milliequivalent weight of acrylic acid.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° C. and 80° C. The resulting polymer is recovered from the aqueous medium, as by drum drying, and can be subsequently ground to the desired particle size. The particle size should be fine enough to facilitate dispersion of the polymer in water. A presently preferred particle size is such that about 90 weight percent will pass through a number 10 mesh sieve, and not more than about 10 weight percent will be retained on a 200 mesh sieve (U.S. Bureau of Standards Sieve Series).

Under proper conditions of use, examples of copolymers which can be used in the practice of the invention can include the water-dispersible copolymers resulting from the polymerization of acrylamide or methacrylamide with an ethylenically unsaturated monomer copolymerizable therewith. It is desirable that sufficient acrylamide or methacrylamide be present in the monomers mixture to impart to the resulting copolymer the above-described water-dispersible properties. Any suitable ratio of monomers meeting this condition can be used. Under proper conditions of use, examples of suitable ethylenically unsaturated monomers can include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl substituted cationic quaternary ammonium compounds, and the like. Various methods are known in the art for preparing said copolymers. For example, see U.S. Pat. Nos. 2,625,529; 2,740,522; 2,727,557; 2,831,841; and 2,909,508. Said copolymers can be used in the hydrolyzed form, as discussed above for the homopolymers.

One presently preferred group of copolymers for use in the practice of the invention are the copolymers of acrylamide or methacrylamide with a monomer of the formula

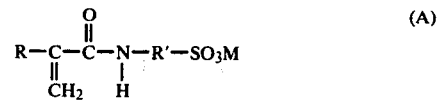

where: R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; and M is hydrogen, ammonium, or an alkali metal, said M preferably being hydrogen, sodium, or potassium; and wherein the number of repeating units from said formula (A) monomer is within the range of from 1 up to 100, preferably 5 to 80, more preferably 10 to 70, mol percent. It is contemplated that homopolymers of the monomer (A) can also be used in the present invention.

Monomers of the above formula (A) and methods for their preparation are known in the art. For example, see U.S. Pat. No. 3,507,707, issued Apr. 14, 1970, in the name of L. E. Miller et al; and U.S. Pat. No. 3,768,565, issued Oct. 30, 1973, in the name of L. J. Persinski et al. In the above formula (A), when R is hydrogen, R' is

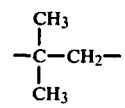

and M is hydrogen, said monomer is the well-known AMPS (trademark) monomer, 2-acrylamido-2-methylpropanesulfonic acid, which is available commercially from The Lubrizol Corporation, Cleveland, Ohio. The alkali metal salts of said monomer, e.g., sodium 2-acrylamido-2-methylpropane sulfonate, are also readily available.

Copolymers of acrylamide with said AMPS monomer, and/or its sodium salt, are known. For example, see the above-mentioned Persinski patent. A number of said copolymers are also available from Hercules Incorporated, Wilmington, Delaware. For example, Hercules SPX-5024, a 90:10 acrylamide/AMPS sodium salt copolymer; Hercules SPX-5022, and 80:20 acrylamide/AMPS sodium salt copolymer; Hercules SPX-5023, a 50:50 acrylamide/AMPS sodium salt copolymer; and Hercules SPX-5025, a 30:70 acrylamide/AMPS sodium salt copolymer. The above type of copolymers wherein the number of units from said formula (A) monomer is within the range of from 10 to 70 mol percent thus comprise one presently more preferred group of copolymers for use in the practice of the invention. Said copolymers can be represented by the formula

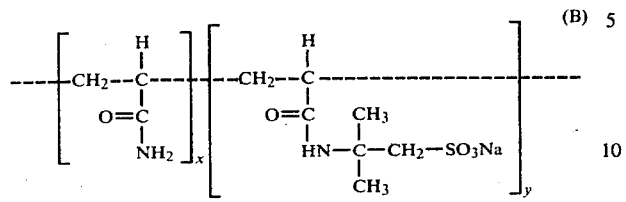

wherein x and y represent the mol percent of said units as set forth above, it being understood that the various copolymers do not necessarily consist of alternating units as depicted above in (B). It is also within the scope of the invention for the acrylamide units in the above formula (B) to be methacrylamide units and for a portion of the —NH₂ groups in said units to be hydrolyzed.

Thus, it is also within the scope of the invention for the acrylamide units in the above formula (B) to be derived from either acrylamide or methacrylamide wherein the —NH₂ group can be NH₂ or —OM as defined below. Thus, copolymers of said derivatives with the above monomer (A) can be represented by the formula

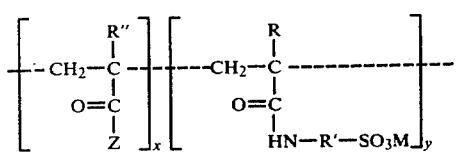

wherein R, R′, and M are as defined above in formula (A); R″ is hydrogen or a methyl radical; Z is either—NH₂ or —OM in the above Type I monomer units, with the proviso that the copolymer contains at least 10 mol percent of said Type I monomer units in which Z is —NH₂; and x and y are the mol percent values of the respective individual monomer units I and II, with x being in the range of from about 1 to 99, preferably 20 to 95, more preferably 30 to 90, and with y being in the range of from about 1 to 99, preferably 5 to 80, more preferably 10 to 70; and with it being understood that the various copolymers do not necessarily consist of alternating monomer units as depicted in formula (B′), e.g., the copolymers are random copolymers are represented by the broken lines connecting said monomer units. It is presently believed that in the above copolymers it is desirable that there be at least 10 mol percent of monomer units containing the —CONH₂ group in order for gelation to take place at a suitable rate in the presence of the aldehyde-phenolic compound gelling system of the present invention.

Another presently preferred group of copolymers for use in the practice of the invention are the copolymers of acrylamide or methacrylamide with a monomer of the formula

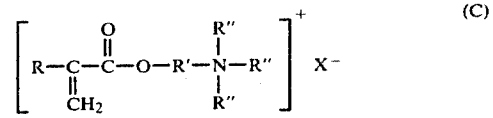

wherein R is hydrogen or a lower alkyl radical containing from 1 to 6 carbon atoms, said R preferably being hydrogen or a methyl radical; R′ is an alkylene radical containing from 1 to 24 carbon atoms or an arylene radical containing from 6 to 10 carbon atoms, said R′ preferably being an alkylene radical containing from 2 to about 10 carbon atoms; each R″ is an alkyl radical containing from 1 to 6 carbon atoms, preferably from 1 to 4 carbon atoms; X is any suitable anion such as methylsulfate, ethylsulfate, chloride, bromide, acetate, nitrate, and the like; and wherein the number of repeating units from said formula (C) monomer is within the range of about 1 up to 100, preferably 5 to 70, more preferably 10 to 60, mol percent. It is contemplated that homopolymers of the monomer (C) can also be used in the present invention.

Monomers of the above formula (C) and methods for their preparation are known in the art. For example, see U.S. Pat. No. 3,573,263, issued Mar. 30, 1971, in the name of E. A. Gill. In the above formula (C), when R is H, R′ is —CH₂—CH₂—, one R″ is a methyl radical and the other two R″ are each an ethyl radical, and X is a CH₃SO₄⁻ anion, the monomer is the commercially available material (acryloyloxyethyl)diethylmethylammonium methyl sulfate, which can be referred to as DEMMS. In the above formula (C), when R is a methyl radical, R′ is —CH₂—CH₂—, each R″ is a methyl radical, and X is a CH₃S₄⁻ anion, the monomer is the commercially available material (methacryloxyethyl)trimethylammonium methylsulfate, sometimes referred to as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten 210, a 90:10 acrylamide/MTMMS copolymer; Hercules Reten 220, an 80:20 acrylamide/MTMMS copolymer; Hercules Reten 245, a 55:45 acrylamide/MTMMS copolymer; and Hercules Reten 260, a 40:60 acrylamide/MTMMS copolymer. The type of copolymers wherein the number of units from said formula (C) monomer is within the range of from 10 to 60 mol percent thus comprise another more preferred group of copolymers for use in the practice of the invention. Said copolymers can be represented by the formula

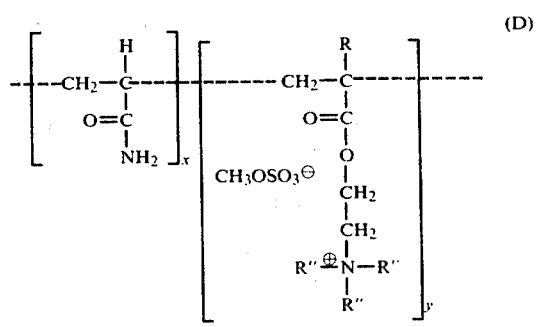

wherein R is either hydrogen or a methyl radical; each R" is a methyl radical, or one R" is a methyl radical and the other two R" are each an ethyl radical; and x and y represent the mol percent of said units as set forth above, it being understood that the various copolymers do not necessarily consist of alternating units as depicted above in (D). It is also within the scope of the invention for the acrylamide units in the above formula (D) to be methacrylamide units, and for a portion of the —NH₂ groups in said units to be hydrolyzed.

Thus, it is also within the scope of the invention for the acrylamide units in the above formula (D) to be derivatives of either acrylamide or methacrylamide wherein the —NH₂ groups can be —NH₂ or —OM as defined below. Thus, copolymers of said derivatives with the above monomer (C) can be represented by the formula

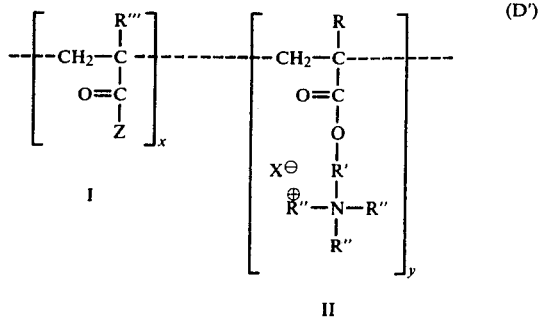

wherein, R, R', R", and X are as defined above in formula (C); R''' is hydrogen or a methyl radical; in the above Type I monomer units, Z is either —NH₂ or —OM wherein M is hydrogen, ammonium, or an alkali metal, with said M preferably being hydrogen, sodium, or potassium, and with the proviso that the copolymer contains at least 10 mol percent of said Type I monomer units in which Z is —NH₂; x and y are the mol percent values of the respective individual monomer units I and II, with x being in the range of from about 1 to 99, preferably 30 to 95, more preferably 40 to 90, and with y being in the range of from about 1 to 99, preferably 5 to 70, more preferably 10 to 60; and with it being understood that the various copolymers do not necessarily consist of alternating monomer units as depicted in formula (D'), e.g., the copolymers are random copolymers as represented by the broken lines connecting said monomer units. It is presently believed that in the above copolymers it is desirable that there be at least 10 mol percent of monomer units containing the —CONH₂ group in order for gelation to take place in the presence of an aldehyde-phenolic compound gelling system in accordance with the present invention.

Crosslinked polyacrylamides and crosslinked polymethacrylamides, including those at various stages of hydrolysis as described above, and meeting the above-stated compatibility requirements, can also be used in the practice of the invention. In general, said crosslinked polyacrylamides can be prepared by the methods described above, but including in the monomeric mixture a suitable amount of a suitable crosslinking agent. Examples of crosslinking agents can include methylenebisacrylamide, divinylbenzene, divinyl ether, and the like. Said crosslinking agents can be used in small amounts, e.g., up to about 1 percent by weight of the monomeric mixture. Such crosslinking is to be distinguished from any crosslinking which occurs when solutions of polymers and the other components of the gelled acidic compositions of the invention are gelled as described herein.

Polyacrylamides useful in the practice of the invention are characterized by high molecular weight. The molecular weight is not critical so long as the polymer has the above-described water-dispersible properties and meets the above-stated compatibility requirements. It is preferred that the polymer have a molecular weight of at least 500,000, more preferably at least about 2,000,000. The upper limit of molecular weight is unimportant so long as the polymer is water-dispersible, and the gelled acidic composition therefrom can be pumped. Thus, it is within the scope of the invention to use polymers having molecular weights as high as 20,000,000 or higher, and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Distilled water containing 25 ppm of a polymer of acrylamide having a molecular weight of about $10 \times 10^6$ had a viscosity increase of about 41 percent. At 50 ppm the viscosity increase was about 106 percent. At 100 ppm the viscosity increase was about 347 percent. As another example, distilled water containing 25 ppm of a polymer of acrylamide having a molecular weight of about $3.5 \times 10^6$ had a viscosity increase of about 23 percent. At 50 ppm the viscosity increase was about 82 percent. At 100 ppm the viscosity increase was about 241 percent. Generally speaking, amounts of the above-described polymers in the range of from 0.1 to 3, preferably from 0.3 to about 2, weight percent, based on the total weight of the composition, can be used in preparing gelled acidic compositions for use in the practice of the invention.

As a further guide, when the polymer used is one of the above-discussed AMPS or AMPS salt copolymers containing 50 mol percent or more AMPS or AMPS salt units, the polymer concentration will preferably be in the range of 0.6 to 3, more preferably 0.75 to about 2 weight percent, based on the total weight of the composition. Similarly, when the polymer is used a partially hydrolyzed polyacarylamide or polymethacrylamide, or one of the above-discussed MTMMS or DEMMS copolymers, the polymer concentration will preferably be in the range of from 0.75 to about 2 weight percent, based on the total weight of the composition. However, it is within the scope of the invention to use amounts outside said ranges. In general, with the proper amounts of acid, aldehyde, and phenolic compound, the amount of polymer used will determine the consistency of the gel obtained. Small amounts of polymer will usually produce liquid mobile gels which can be readily pumped. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used so long as the gelled acid composition can be pumped in accordance with the methods of the invention.

In general, any of the water-soluble cellulose ethers can be used to prepare the aqueous gels used in the practice of the invention. Said cellulose ethers which can be used include, among others, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to, and they are commonly referred to as CMC for carboxymethyl cellulose, CMHEC for carboxymethyl hydroxyethyl cellulose, etc. For example, water-soluble CMC is commercially available in various degrees of carboxylate substitution ranging from about 0.3 up to the maximum degree of substitution of 1.6. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above preferred ranges is usually less uniform in properties and thus less desirable for use in the practice of the invention. CMC having a degree of substitution greater than the above preferred usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

Other polymers that can be used in the gels of the invention include guar gum, polyvinylpyrrolidone, and biopolysaccharides, which are biochemically synthesized polysaccharides. These polymers are well known and can be produced in accordance with known procedures. Preparation details of the biopolysaccharides or heteropolysaccharides produced by the action of bacteria of the genus Xanthomonas upon sugar, starches, and similar carbohydrates can be found in U.S. Pat. Nos. 3,020,206; 3,163,602; and 3,243,000. The amounts of these polymers used in the instant gel compositions can be the same as for the acrylamide polymers and cellulose ethers.

Any suitable water-dispersible aldehyde meeting the above-stated compatibility requirements can be used in the practice of the invention. Thus, under proper conditions of use, both aliphatic and aromatic monoaldehydes, and also dialdehydes, can be used. The aliphatic monoaldehydes containing from 1 to about 10 carbon atoms per molecule are presently preferred. Representative examples of such aldehydes include formaldehyde, paraformaldehyde, acetaldehyde, propionaldehyde, butyraldehyde, isobutyraldehyde, valeraldehyde, heptaldehyde, decanal, and the like. Representative examples of dialdehydes include glyoxal, glutaraldehyde, terephthaldehyde, and the like. Various mixtures of said aldehydes can also be used in the practice of the invention. The term "water-dispersible" is employed generically herein to include both those aldehydes which are truly water-soluble and those aldehydes of limited water solubility but which are dispersible in water or other aqueous media to be effective gelling agents.

Any suitable water-dispersible phenol or naphthol meeting the compatibility requirements set forth above can be used in the practice of the invention. Suitable phenols include monohydroxy, as well as polyhydroxy, compounds including monohydroxy and polyhydroxy naphthols.

Phenolic compounds suitable for use in the present invention include phenol, catechol, resorcinol, hydroquinone, phloroglucinol, pyrogallol, 4,4'-diphenol, 1,3-dihydroxynaphthalene, and the like. Resorcinol is the preferred phenolic compound for use in the present invention.

Any suitable amount of aldehydes and phenolic compounds can be used in the practice of the invention. In all instances the amounts of aldehyde and phenolic compound used will be a small but effective amount which is sufficient to cause gelation of an aqueous dispersion of the polymer, the acid, the aldehyde, and the phenolic compound. As a general guide, the amount of aldehyde used in preparing the gelled acidic compositions of the invention will be in the range of from about 0.003 to 1.2, preferably from 0.04 to about 1 weight percent based on the total weight of the composition. The amount of phenolic compound used will be in the range of from about 0.001 to 2, preferably from about 0.04 to about 1 weight percent based on the total weight of the composition. The molar ratio of aldehyde to phenolic compound will be in the broad range of from about 0.1:1 to 25:1, with a preferred range from 0.5:1 to 2.5:1, more preferably from 1:1 to 2:1.

Acids useful in the practice of the invention include any acid meeting the above-stated compatibility requirements and which is effective in increasing the flow of fluids, e.g., hydrocarbons, through the formation and into the well. Thus, under proper conditions of use, examples of such acids can include inorganic acids such as hydrochloric acid, phosphoric acid, nitric acid, and sulfuric acid; $C_1$-$C_4$ organic acids as formic acid, acetic acid, propionic acid, butyric acid, and mixtures thereof, and combinations of inorganic and organic acids. The nonoxidizing acids are preferred. The concentration or strength of the acid can vary depending upon the type of acid, the type of polymer, the type of formation being treated, the above-stated compatibility requirements, and the results desired in the particular treating operation. In regard to the cellulose ether polymers and the acrylamide-derived polymers, the acid concentration of organic acids can vary from 0.4 to about 60 weight percent, with concentrations within the range of 10 to 50 weight percent usually preferred, based upon the total weight of the gelled acidic composition. When an inorganic acid such as hydrochloric acid is used with the acrylamide-derived polymers of the present invention it is presently preferred to use an amount which is sufficient to provide an amount of HCl within the range of from 0.4 to about 35, more preferably at least about 10, weight percent based on the total weight of the gelled acidic composition. Amounts within the range of about 10 to about 30 weight percent will frequently be practical amounts to use. When an inorganic acid such as hydrochloric acid is used with the cellulose ether polymers of the present invention it is presently preferred to use an amount which is sufficient to provide an amount of HCl within the range of 0.4 to about 20, more preferably 5 to 15, weight percent based on the total weight of the gelled acidic composition. The acids used in the practice of the invention can contain any of the known corrosion inhibitors, deemulsifying agents, sequestering agents, surfactants, friction reducers, etc., known in the art, and which meet the above-stated compatibility requirements.

The gelled acidic compositions of the invention are aqueous compositions. They normally contain a significant amount of water. The amount of said water can vary widely depending upon the concentrations of the other components in the compositions, particularly the concentration of the acid. For example, when an organic acid such as acetic acid is used in a concentration of 60 weight percent, the amount of water present in the composition clearly will be less than when an inorganic acid such as HCl is used in the maximum concentration of about 35 weight percent. Thus, while no precise overall range of water content can be set forth, based on the above-stated overall ranges for the concentrations of said other components, the water content of said compositions can be in the range of from about 30 to about 99, frequently about 60 to about 90, weight percent. However, amounts of water outside said ranges can be used.

Propping agents can be included in the gelled acidic compositions of the invention if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used, they should be made of materials which are not severely attacked by the acid used during the time they are exposed to said acid.

Any suitable method can be employed for preparing the gelled acidic compositions of the invention. Thus, any suitable mixing technique or order of addition of the components of said composition to each other can be employed which will provide a composition having sufficient stability to degeneration by the heat of the formation (in which the composition is to be used) to permit good penetration of the composition into, and significant etching of, said formation. However, it is ordinarily preferred to first dissolve or disperse the polymer in water before contacting the polymer with acid. The mixing order can vary with the type of polymer used. Some suitable mixing orders for the acrylamide-derived polymers with the components named in order of mixing include: water—polymer—phenolic compound—acid—aldehyde; water—phenolic compound—acid—polymer—aldehyde; acid—polymer—water—phenolic compound—aldehyde; and water—polymer—phenolic compound—aldehyde—acid; and the like. The inventive compositions comprising cellulose ether, water, acid, phenolic compound, and aldehyde generally involve adding the acid last because of the instability of said ethers in the presence of acids. It is within the scope of the invention to moisten or slurry the polymer with a small amount, e.g., about 1 to about 6 weight percent based on the weight of the polymer, of a small amount of a low molecular weight alcohol, e.g., $C_1$ to $C_3$ alcohols, as a dispersion aid prior to dispersing the polymer in water. It is preferred that there be no undue delay between completing the preparation of the gelled acidic composition and its introduction into contact with the formation.

The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "on the fly". For example, a solution of the polymer in water can be prepared in a tank adjacent the well head. Pumping of this solution through a conduit to the well head can then be started. In regard to the polyacrylamide-type polymers, a few feet downstream from the tank a suitable connection can, for example, be provided for introducing either the acid or phenolic compound into said conduit, preferably as an aqueous solution. Then a few feet farther downstream the other of said acid or phenolic compound and the aldehyde component can be similarly introduced. As will be understood by those skilled in the art, the rate of introduction of said components into said conduit will depend upon the pumping rate of the polymer solution through said conduit. Any of the above-mentioned mixing orders for the acrylamide-derived polymers can be used in said "on the fly" technique but the acid component should always be added last in the cellulose ether systems. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order to 100° F. to 250° F.

The following examples will serve to further illustrate the invention but should not be considered as unduly limiting on the invention. In carrying out the examples with acrylamide-derived polymers the following general procedure was employed.

A 3.0 weight percent stock solution of polymer or copolymer was prepared at ambient temperature in deionized water. A portion of this stock solution weighed into a beaker was admixed with sufficient water and concentrated hydrochloric acid (37 weight percent HCl), e.g., to give the desired polymer concentration and acid concentration in individual samples for the test runs. Sufficient aldehyde, phenolic compound, and water was added to the acid and polymer-containing solution to give about 100 ml of solution. After addition to the aldehyde and phenolic compound, the solutions were stirred for about 20 seconds before transferring a 15 ml portion thereof into a Kimax No. 500 capillary viscometer for viscosity measurements which are reported herein as the efflux time in seconds corresponding to the time required for the fluid level to drop from one mark to another on the capillary arm of the viscometer. After the first measurement of efflux time, the viscometer containing the sample was placed in a water bath at about 87° F. The temperature of the water bath was increased at a rate sufficient for the bath temperature to reach about 200° F. in about one hour. During this heating period the efflux time of the sample was repeatedly measured at different temperatures over the entire temperature range. The temperature at which little or no movement of the fluid in the capillary could be detected was designated as the gelation temperature. The onset of gelation was signaled by an increase in the efflux time over a temperature interval, and this interval is indicated in the examples. The gels involving the cellulose ethers were similarly prepared but the acid component was always added last.

The following examples demonstrate the operability of the present invention which discloses the gelation of thickened aqueous acid solutions with aldehydes and phenolic compounds.

EXAMPLE I

Different concentrations of resorcinol and formaldehyde (HCHO) were used to gel one weight percent aqueous solutions of a partially hydrolyzed polyacrylamide containing 10 weight percent hydrochloric acid. The polyacrylamide used was a commercially available acrylamide homopolymer (Hercules Reten 420 polyacrylamide) having a degree of hydrolysis of 6.3 percent. The results of these runs are summarized below.

Attention is called to the fact that in Runs 5 and 6 of Table I, the concentration of HCl was, respectively, 0 weight percent and 28 weight percent.

TABLE I

| Run No. | Gelation Temperature, °F. | Concentration Resorcinol (Wt. %) | Concentration HCHO (Wt. %) | Observations |
|---|---|---|---|---|
| 1 | 126* | 0.0 | 2.0 | Gelation started at 110° F. (19 minutes in heating bath); fully gelled at 126° F. (26 minutes in heating bath). |
| 2 | 146* | 0.0 | 0.2 | Gelation started at 132° F. (32 minutes in heating bath); fully gelled at 146° F. (38 minutes in heating bath). Syneresis was about 25% at 190° F. (72 minutes in heating bath). |
| 3 | 103* | 0.2 | 0.2 | Gelation started at 96° F. (10 minutes in heating bath); fully gelled at 103° F. (13 minutes in heating bath). Syneresis was about 15% at 200° F. (67 minutes in heating bath). |
| 4 | Ambient* | 2.0 | 2.0 | Gelation in about 1 minute after mixing; syneresis began almost immediately at ambient temperature. |
| 5 | 200$^a$ | 1.0 | 0.4 | Gel started forming slowly at 200° F. |
| 6 | 121$^b$ | 1.0 | 0.2 | The nature of this gel gave the impression that it would be more resistant to shear degradation than a gel prepared with HCHO alone. Starts gelling slowly at 95° F. |

$^a$The concentration of HCl in this run was 0 weight percent.
$^b$The concentration of HCl in this run was 28 weight percent.
*The concentration of HCl in these runs was 10 weight percent.

As shown by the results in Table I (see Runs 2 and 3), the gelation temperature was decreased from about 146° F. to 103° F. by adding resorcinol to the gelling system. A tenfold increase in HCHO concentration (see Run 1) in the absence of resorcinol decreased the gelation temperature from 146° F. to about 126° F. Run 4 illustrates that a tenfold increase in the concentration of resorcinol and formaldehyde gave very unstable gels. Run 5 was carried out in the absence of HCl and gelation began at the much higher temperature of 200° F. Run 6 illustrates that the inventive gelation system is operable with even 28 weight percent hydrochloric acid but the ratio of resorcinol to HCHO was increased to 5:1. This system began gelling at about the same temperature as the 10 weight percent HCl system of Run 3 in which the resorcinol to formaldehyde ratio was 1:1.

EXAMPLE II

Two concentration levels of resorcinol and formaldehyde were used to gel one weight percent aqueous solutions of (methacryloyloxyethyl)trimethylammonium methyl sulfate (Hercules cationic homopolymer identified as Hercofloc 828) containing 28 weight percent hydrochloric acid. Run 3 in Table II illustrates that no gel formed in the absence of resorcinol up to 199° F.

TABLE II

| Run No. | Gelation Temperature, °F. | Concentration Resorcinol (Wt. %) | Concentration HCHO (Wt. %) | Observations |
|---|---|---|---|---|
| 1 | 172 | 0.027 | 0.0106 | Gels at 172° F.* |
| 2 | 195 | 0.013 | 0.005 | Starts gelling* at 195° F. (64 minutes in heating bath). |
| 3 | No gelation | 0.0 | 2.0 | No gelation on heating to 199° F. |

*These gels were heated at 250° F. for two hours, and, although the gels appeared to become brittle, they seemed to be good gels.

As shown by the results in Table II, Runs 1 and 2 illustrate the gelling effectiveness of the inventive resorcinol-formaldehyde system. Formaldehyde alone in 28 weight percent hydrochloric acid (see Run 3) did not effect the gelation of the above-identified cationic homopolymer.

EXAMPLE III

Three concentration levels of resorcinol and formaldehyde were used to treat one weight percent aqueous solutions of 30:70 acrylamide/sodium 2-acrylamido-2-methylpropanesulfonate copolymer (identified as Hercules SPX-5025) containing 28 weight percent hydrochloric acid. The results of these runs are summarized below.

TABLE III

| Run No. | Gelation Temperature, °F. | Concentration Resorcinol (Wt. %) | Concentration HCHO (Wt. %) | Observations |
|---|---|---|---|---|
| 1 | * | 0.02 | 0.008 | On heating to 250° F. the fluid product remained viscous and appeared to be shear-thickening. |
| 2 | 137 | 0.04 | 0.016 | A portion of the gel was heated to 250° F. and thereafter the sample appeared to be shear-thickening. |
| 3 | Ambient | 0.12 | 0.048 | A gel formed in 1-2 minutes at ambient temperature. A portion of this gel after heating to 250° F. appeared to be shear-thickening. |

*Fluid thickened at 128° F. but did not gel. Some thinning of this fluid was noted at 159° F.

As shown by the results in Table III, Run 2 appears to have the most desirable level of resorcinol and formaldehyde. Run 3 perhaps contains too high a level of resorcinol-formaldehyde whereas Run 1 has too low a level of the inventive gelling system.

EXAMPLE IV

Two concentration levels of resorcinol and formaldehyde were used to treat one weight percent aqueous solutions of hydroxyethyl cellulose (Hercules Natrosol 250 HHW hydroxyethyl cellulose) containing 10 weight percent hydrochloric acid and 28 weight percent hydrochloric acid. The results of these runs are summarized below.

TABLE IV

| Run No. | Gelation Temperature, °F. | Concentration Resorcinol (Wt. %) | Concentration HCHO (Wt. %) | Observations |
|---|---|---|---|---|
| 1 | 91[a] | 0.25 | 0.10 | Gelation starts at 84° F. This sample was fully gelled at 91° F. after 10 minutes in the heating bath. This gel broke abruptly at 143° F. after 31 minutes in the heating bath. |
| 2 | * | 0.25 | 0.10 | This sample gelled at ambient temperature but the gel broke in a very few minutes. |
| 3 | * | 0.10 | 0.04 | This sample behaved in essentially the same manner as did the sample in Run 2. |

[a]This run contained 10 weight percent hydrochloric acid and became extremely viscous at 84° F.
*These runs contained 28 weight percent hydrochloric acid.

As shown by the results in Table IV, the inventive gelling system is operable in 10 weight percent hydrochloric acid (see Run 1). Runs 2 and 3 indicate the instability of cellulose ether gels in 28 weight percent hydrochloric acid.

EXAMPLE V

Two concentration levels of resorcinol and formaldehyde were used to treat one weight percent aqueous solutions of carboxymethyl cellulose containing 10 weight percent hydrochloric acid. The results of these runs are summarized in Table V.

TABLE V

| Run No. | Gelation Temperature, °F. | Concentration Resorcinol (Wt. %) | Concentration HCHO (Wt. %) | Observations |
|---|---|---|---|---|
| 1 | Ambient[a] | 0.25 | 0.10 | This sample gelled at ambient temperature and broke almost immediately. |
| 2 | Ambient[a] | 0.10 | 0.04 | This sample became extremely viscous at ambient temperature. The approximate viscosity after 17 minutes at ambient temperature was 2000 cp and about 24000 cp after 154 minutes. |

[a]The concentration of hydrochloric acid was 10 weight percent in these runs.

As shown by the results in Table V, the cellulose ether system gave thermally unstable viscous fluids. In Run 2 the viscosity of the sample was even greater after 154 minutes at ambient temperature than had been observed after 17 minutes.

EXAMPLE VI

In accordance with the present invention, gels comprising phloroglucinol, formaldehyde, aqueous HCl and polymer were prepared. The polymers used were Kelzan® (a biopolysaccharide prepared by employing bacteria of the genus Xanthomonas), guar gum and polyvinylpyrrolidone. Stock solutions containing, respectively, 1.5 weight percent Kelzan and 1.5 weight percent guar gum were prepared in tap water. The stock solution of polyvinylpyrrolidone contained 3.0 weight percent polymer. In each of the runs, 166 ml aliquots of polymer stock solution were mixed with 66 ml water, 1.25 ml aqueous formalin (37 weight percent formaldehyde), 0.3 g phloroglucinol and 0.25 ml of aqueous sodium hydroxide solution (0.5 g NaOH/ml). The sodium hydroxide were added to facilitate the dissolution of the phloroglucinol. Gelation occurred on the addition of sufficient concentrated aqueous HCl (18 ml) to give a final composition containing 3 weight percent HCl. Control runs were made ungelled polymers. The viscosities of all the compositions were measured on a modified Stormer viscometer after standing for 10-15 minutes at ambient temperature and the results are shown below in Table VI.

TABLE VI

Acid Gels with a Phloroglucinol-Formaldehyde System Using 1 Weight Percent Polymer and 3 Weight Percent HCl

| Run | Polymer | Viscosity (cp) |
|---|---|---|
| Control-A | Kelzan (Ungelled) | 365 |
| Invention-A | | 2400 |
| Control-B | Guar Gum (Ungelled) | 285 |
| Invention-B | | 2800 |
| Control-C | Polyvinylpyrrolidone (Ungelled) | 20 |
| Invention-C | (2 wt. percent polymer) | 950 |

The above viscosity values taken after a period of 10-15 minutes at ambient temperature demonstrate the rapid gelling of thickened aqueous acid solutions with the phloroglucinol-formaldehyde system.

EXAMPLE VII

This example demonstrates, respectively, the gelation of Reten 420 (polyacrylamide) and Natrosol 250 HHW (hydroxyethyl cellulose) in the system resorcinol-acetaldehyde-5% HCl. The results of these runs are shown in Table VII.

TABLE VII

Gelation of Reten 420 and Natrosol 250 HHW in the System Resorcinol-Acetaldehyde-5% HCl

| Polymer | Aldehyde | Phenolic | Efflux Time (sec.) at 5-Minute Intervals at 75° F.[a] | | | | | | | | | | | | |
|---|---|---|---|---|---|---|---|---|---|---|---|---|---|---|---|
| | | | 0 | 5 | 10 | 15 | 20 | 25 | 30 | 35 | 40 | 45 | 50 | 55 | 60 |
| Reten 420 | Acetaldehyde | Resorcinol | 19.0 | 18.7 | 18.8 | 18.9 | 18.9 | 18.9 | 22.2 | 30.8 | * | | | | |
| Reten 420 | Formaldehyde | Resorcinol | 16.8 | 16.9 | 16.7 | 16.8 | 16.9 | 17.3 | 17.4 | 17.6 | 17.4 | 18.2 | 18.2 | 18.5 | 19.8 |
| Reten 420 | Formaldehyde | Resorcinol | 12.7 | 11.8 | 12.2 | ** | | | | | | | | | |
| Natrosol 250 HHW | Acetaldehyde | Resorcinol | | 700 | | | 1000 | | # | | | | | | |

[a]The efflux times observed in the viscometer tests indicate the time necessary for the test fluid to pass between two marks on the capillary arm of the viscometer. Efflux time increases as the test fluid becomes more viscous.
*System gelled after 40 minutes at 75° F.
**This formaldehyde system gelled after 15 minutes at 120° F. This sytem had not gelled after 60 minutes at 75° F.
This acetaldehyde system gelled after 35 minutes at 75° F.

The results in the above table illustrate the gelation of polyacrylamide (Reten 420) and hydroxyethyl cellulose (Natrosol 250 HHW) with the inventive system resorcinol-acetaldehyde-5% HCl. The formaldehyde system in Table VII did not gel at 75° F. whereas the acetaldehyde-containing system gelled after 40 minutes at 75° F. However, the formaldehyde system did gel after 15 minutes at the higher temperature of 120° F. The hydroxyethyl cellulose system gelled after 35 minutes at 75° F.

In the above runs the Reten 420 systems were formulated by mixing 66.7 ml of a fresh water 1.5 weight percent polymer solution with 22 ml water and 0.25 g resorcinol followed by 11.4 ml concentrated aqueous HCl. After cooling to room temperature, 0.5 ml acetaldehyde was added and the capillary viscometer readings were noted at the specified temperatures and recorded. In the Reten 420-formaldehyde system, 0.5 ml of 37 weight percent aqueous formalin was used in place of the 0.5 ml acetaldehyde. The Natrosol 250 HHW run was carried out in essentially the same manner except for the use of 0.25 ml acetaldehyde.

I claim:

1. A gelled acidic composition comprising:
   water,
   a water-thickening amount of a water-dispersible polymer selected from the group consisting of water-dispersible cellulose ethers, polyacrylamides, polymethacrylamides, guar gum, polyvinylpyrrolidone, and biopolysaccharides or heteropolysaccharides produced by the action of bacteria of the genus Xanthomonas upon carbohydrates,
   an amount of a non-oxidizing acid which is capable of, and sufficient for, reacting with a significant amount of the acid-soluble components of a subterranean formation, and
   a small, but effective amount, about 0.003 to about 1.2 weight percent, of one or more water-dispersible aldehyde(s) selected from the group consisting of aliphatic monoaldehydes having from one to about 10 carbon atoms per molecule, glyoxal, glutaraldehyde, and terephthaldehyde and from about 0.001 to about 2 weight percent of one or more water-dispersible phenolic compounds selected from the group consisting of phenol, catechol, resorcinol, hydroquinone, phloroglucinol, pyrogallol, 4,4'-diphenol, and 1,3-dihydroxynaphthalene sufficient to cause gelation of an aqueous dispersion of said polymer, said acid, said aldehydes, and said phenolic compounds.

2. A composition according to claim 1 wherein:
   the amount of said polymer is within the range of from 0.1 to about 3 weight percent based upon the total weight of said composition;
   the amount of said aldehyde is within the range of from about 0.003 to about 1.2 weight percent based upon the total weight of said composition;
   the amount of said phenolic compound is within the range of from about 0.001 to about 2 weight percent based upon the total weight of said composition; and
   the amount of said acid is within the range of from about 0.4 to about 60 weight percent based upon the total weight of said composition.

3. A composition according to claim 2 wherein:
   said polymer is a partially hydrolyzed polyacrylamide wherein not more than about 45 percent of the carboxamide groups are initially hydrolyzed to carboxyl groups, and the amount thereof is within the range of from 0.1 to about 3 weight percent based on the total weight of said composition; and
   said acid is hydrochloric acid, and the amount thereof is sufficient to provide an amount of HCl within the range of from 0.4 to about 35 weight percent based on the total weight of said composition.

4. A composition according to claim 1 wherein said aldehyde is formaldehyde or acetaldehyde and said phenolic compound is resorcinol or phloroglucinol.

5. A composition according to claim 1 wherein:
   said polymer is a cellulose ether; and
   said acid is hydrochloric acid and the amount thereof is sufficient to provide an amount of HCl within the range of 0.4 to about 20 weight percent based upon the total weight of said composition.

6. A composition according to claim 5 wherein said aldehyde is formaldehyde or acetaldehyde and phenolic compound is resorcinol.

7. A composition according to claim 2 wherein:
   the polymer is partially hydrolyzed polyacrylamide, (methacryloyloxyethyl)trimethylammonium methyl sulfate/acrylamide copolymer, or a 30:70 acrylamide/sodium 2-acrylamido-2-methylpropanesulfonate copolymer;
   the acid is HCl;
   the aldehyde is formaldehyde; and
   the phenolic compound is resorcinol.

8. A composition according to claim 2 wherein:
   the polymer is hydroxyethyl cellulose or carboxymethyl cellulose;

the acid is hydrochloric acid and the amount thereof ranges from about 0.4 to about 20 weight percent based upon the total weight of said composition; and said aldehyde is formaldehyde or acetaldehyde and said phenolic compound is resorcinol.

9. A composition according to claim 1 wherein:

said polymer is guar gum, polyvinylpyrrolidone, or a biopolysaccharide;

said acid is hydrochloric acid and the amount thereof is sufficient to provide an amount of HCl within the range of 0.4 to about 20 weight percent based upon the total weight of said composition;

said aldehyde is formaldehyde; and said phenolic compound is phloroglucinol.

10. A method for acid treating a porous subterranean formation susceptible to attack by an acid and penetrated by a well bore, which method comprises:

injecting into said formation via said well bore a gelled acidic composition as defined in claim 1 and maintaining said composition in said formation in contact therewith for a period of time usually sufficient for the acid in said composition to react significantly with the acid-soluble components of said formation and stimulate the production of fluids there from.

11. A method according to claim 10 wherein:

the amount of said polymer is within the range of from 0.1 to about 3 weight percent based upon the total weight of said composition;

the amount of said aldehyde is within the range of from 0.003 to about 1.2 weight percent based upon the total weight of said composition;

the amount of said phenolic compound is within the range of from 0.001 to about 2 weight percent based upon the total weight of said composition; and the amount of said acid is within the range of from about 0.4 to about 60 weight percent based upon the total weight of said composition.

12. A method according to claim 10 wherein said acid is hydrochloric acid, said aldehyde is formaldehyde or acetaldehyde, and said phenolic compound is resorcinol or phloroglucinol.

* * * * *